US010458272B2

(12) United States Patent
Tran et al.

(10) Patent No.: US 10,458,272 B2
(45) Date of Patent: Oct. 29, 2019

(54) INSULATING TEST ENGINE HOOD FOR A TURBINE ENGINE ON A TEST BENCH

(71) Applicant: Techspace Aero S.A., Herstal (Milmort) (BE)

(72) Inventors: Quac Hung Tran, Liege (BE); Pierre Croes, Ohain (BE); Aurore Noelmans, Esneux (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 816 days.

(21) Appl. No.: 14/867,973

(22) Filed: Sep. 28, 2015

(65) Prior Publication Data

US 2016/0108753 A1 Apr. 21, 2016

(30) Foreign Application Priority Data

Oct. 15, 2014 (BE) .................................. 2014/0767

(51) Int. Cl.
*F01D 21/00* (2006.01)
*F02C 3/04* (2006.01)
(Continued)

(52) U.S. Cl.
CPC ............ *F01D 21/003* (2013.01); *C08L 83/04* (2013.01); *C09D 183/04* (2013.01);
(Continued)

(58) Field of Classification Search
CPC ........ F01D 11/08; F01D 11/12; F01D 11/122; F01D 11/125; F01D 11/127;
(Continued)

(56) References Cited

U.S. PATENT DOCUMENTS 4,251,185 A * 2/1981 Karstensen ............. F01D 11/18
415/110
5,818,242 A * 10/1998 Grzybowski ......... F01D 11/025
324/642
(Continued)

FOREIGN PATENT DOCUMENTS

EP 1619489 A1 1/2006

OTHER PUBLICATIONS

Search Report dated Jun. 30, 2015 from Belgium Patent Appl. No. 2014/0767.

*Primary Examiner* — Jason D Shanske
*Assistant Examiner* — Julian B Getachew
(74) *Attorney, Agent, or Firm* — James E. Walton

(57) ABSTRACT

The present application concerns a test engine hood for a turbine engine, such as a double flow turbine. The test hood allows replacement of a flight engine hood during tests on a test bench on the ground where the temperature conditions could damage the flight hood. The test hood includes a tubular wall of carbon-fiber epoxy composite, and metal flanges upstream and downstream. To provide thermal protection, the test hood includes a layer of silicone with a majority of polysiloxane. The layer covers the entire inner surface of the wall to create a barrier. The present application also concerns a method for testing a turbine engine on a test bench, where the turbine engine is fitted with a test casing. The present application also concerns a use of silicone for thermal insulation of the inside of the test hood of the turbine engine on a test bench on the ground.

15 Claims, 3 Drawing Sheets

(51) Int. Cl.
  *F02C 7/20* (2006.01)
  *C08L 83/04* (2006.01)
  *F01D 25/28* (2006.01)
  *G01M 15/02* (2006.01)
  *G01M 15/14* (2006.01)
  *C09D 183/04* (2006.01)
  *F02C 7/045* (2006.01)

(52) U.S. Cl.
  CPC .............. *F01D 25/285* (2013.01); *F02C 3/04* (2013.01); *F02C 7/20* (2013.01); *G01M 15/02* (2013.01); *G01M 15/14* (2013.01); *F02C 7/045* (2013.01); *F05D 2300/30* (2013.01); *F05D 2300/40* (2013.01); *F05D 2300/437* (2013.01); *Y02T 50/672* (2013.01)

(58) Field of Classification Search
  CPC ...... F01D 21/003; F01D 17/02; F01D 25/145; F01D 25/24; F01D 25/243; F01D 25/246; F01D 25/265; F01D 25/285; F02K 1/04; F02K 1/82; G01M 15/14; F23R 3/002; F23R 3/60; F23M 2900/05004; F23M 11/00; F23M 11/04–11/045; F05D 2300/43–2300/437; F05D 2260/83
  See application file for complete search history.

(56) References Cited

U.S. PATENT DOCUMENTS

| | | | |
|---|---|---|---|
| 6,881,029 B2* | 4/2005 | Le Biez | F01D 5/145 |
| | | | 415/119 |
| 7,163,370 B2* | 1/2007 | Kokusho | C23C 4/00 |
| | | | 277/360 |
| 8,161,806 B1 | 4/2012 | Weickert et al. | |
| 2009/0087309 A1* | 4/2009 | Schreiber | F01D 21/045 |
| | | | 415/200 |
| 2012/0167664 A1 | 7/2012 | Krishna et al. | |

* cited by examiner

INSULATING TEST ENGINE HOOD FOR A TURBINE ENGINE ON A TEST BENCH

This application claims priority under 35 U.S.C. § 119 to Belgium Patent Application No. 2014/0767, filed 15 Oct. 2014, titled "Insulating Test Engine Hood for a Turbine Engine on a Test Bench," which is incorporated herein by reference for all purposes.

BACKGROUND

1. Field of the Application

The present application relates to the field of testing turbine engines on a test bench on the ground. More precisely, the present application concerns a dedicated hood for tests of turbine engines installed on a static bench test. The present application also concerns a method for testing a turbine engine on a ground test bench.

2. Description of Related Art

A test bench is used at various stages in the life of a turbine engine. In fact test phases are necessary during design, maintenance or repair following damage to the turbine engine. These tests allow validation of the design and monitoring of the function and settings of turbine engines.

Generally, these tests take place on the ground, on fixed installations which support the turbine engine and resist its thrust. A specific test engine hood is used on this occasion and replaces the engine hood of the turbine engine used in actual flight conditions.

Document EP1619489A1 discloses equipment for ground-based development tests of a turbojet. During test phases, the primary flow uses an annular passage delimited by a nozzle and a dummy nozzle cone which replaces the normal central cone of the turbojet. This dummy nozzle cone has a circular wall surrounding the central part of the turbine engine. Heat from the test can damage the turbine engine or the test equipment itself.

Although test benches allow physical simulation of certain flight conditions, they are not able to reproduce precisely the ambient temperature at altitude nor to provide ventilation similar to flight conditions. Also the ventilation may be degraded by the shape of the test hood, which causes heating of the space between the turbine engine and the test hood, and which could damage the latter or certain components thereof.

Although great strides have been made in the area of testing turbine engines on test benches, many shortcomings remain.

DETAILED DESCRIPTION OF THE PREFERRED EMBODIMENT

Figure 1:
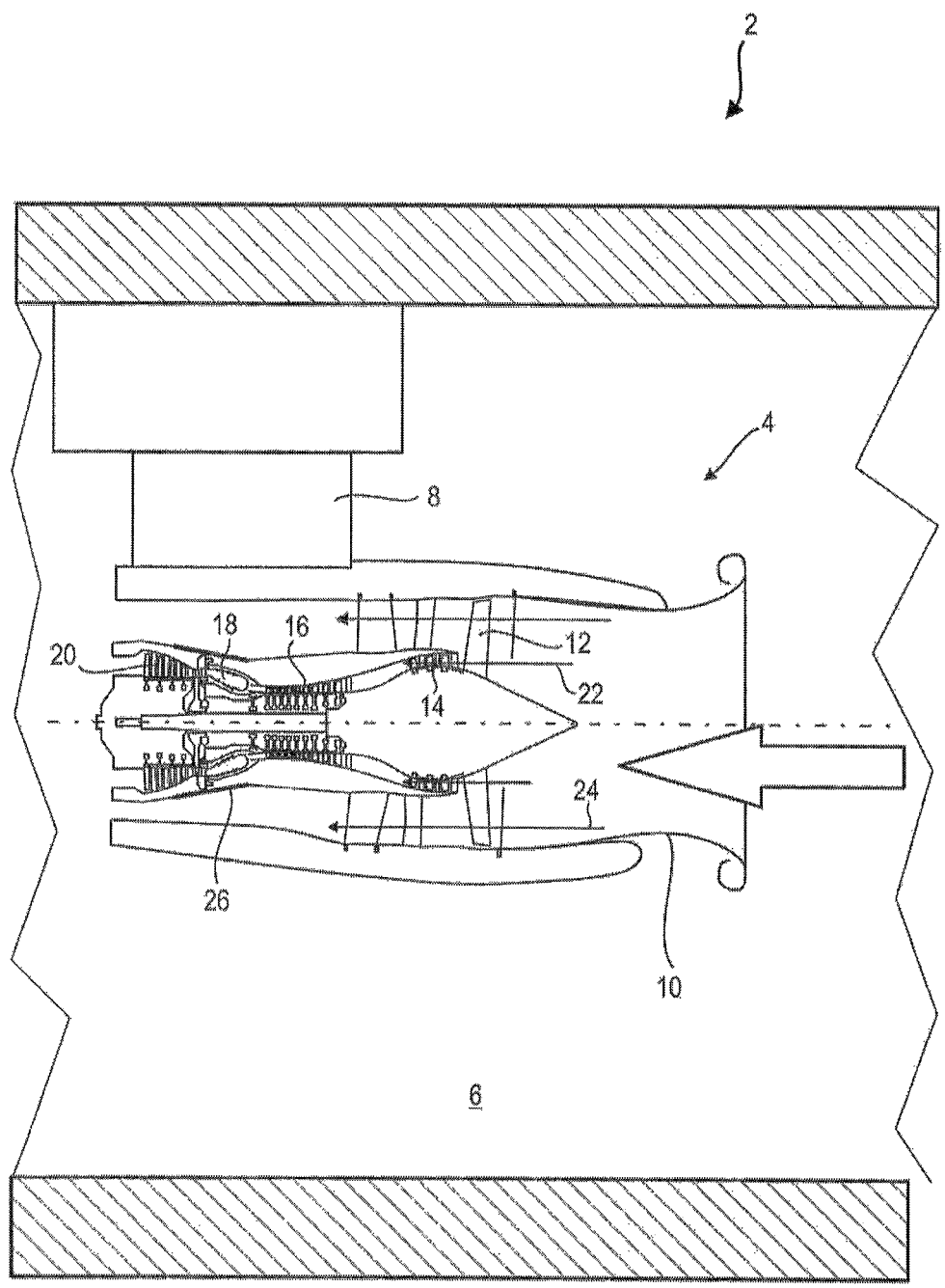
FIG. 1 shows a test bench for an axial turbine engine according to the present application.

The present application aims to overcome at least one of the problems posed by the prior art. More precisely, the present application aims to reduce the consequences of the heating of the turbine engine during testing on ground test benches.

The present application discloses a test engine hood for a turbine engine, intended to replace the flight engine hood of the turbine engine during a test of the turbine engine on a test bench, the test hood comprising a wall with an outer surface intended to delimit an annular flow of the turbine engine, and an inner surface opposite the outer surface, distinguished in that it also comprises a silicone layer covering the inner surface of the wall and able to insulate the wall thermally.

According to an advantageous embodiment of the present application, the wall is made of composite material with an organic matrix such as epoxy matrix.

According to an advantageous embodiment of the present application, the composite material comprises carbon fibres and/or glass fibres, where applicable the composite material comprises a stratified preform with a stack of fibrous layers with glass-fibre layers and carbon-fibre layers.

According to an advantageous embodiment of the present application, the silicone layer covers the majority of the wall, preferably the wall is fully covered by the silicone layer.

According to an advantageous embodiment of the present application, the silicone layer comprises polysiloxane to at least 30%, preferably at least 50% by mass.

According to an advantageous embodiment of the present application, the silicone layer comprises quartz, where applicable to less than 20% by mass.

According to an advantageous embodiment of the present application, the silicone layer comprises reticulants, where applicable between 2% and 20%.

According to an advantageous embodiment of the present application, the wall is circular and is formed from two half-shells, the casing comprising attached axial fixing flanges intended to be fixed to each other, or the wall is formed integrally; in these cases, the wall or each half-shell is made of one material.

According to an advantageous embodiment of the present application, the test hood comprises electrical connections, such as electrical wires, passing through or radially bypassing the wall, where applicable the electrical connections extend between the wall and the silicone layer.

According to an advantageous embodiment of the present application, the test hood comprises sensors such as pressure sensors and/or temperature sensors, preferably the sensors are in contact with the silicone layer.

According to an advantageous embodiment of the present application, the test hood comprises a circular or arcuate flange at each upstream and downstream end of the wall, preferably at least one or each flange is made of metal and is fixed to the wall via fixing pins extending radially towards the inside.

According to an advantageous embodiment of the present application, at least one or each flange comprises a first circular or arcuate portion with follows the inner surface of the wall, and a second arcuate or circular portion which extends the wall flush with the outer surface of the wall, so as to guide the annular flow of the turbine engine.

According to an advantageous embodiment of the present application, the silicone layer has a thickness of between 1.00 mm and 10.00 mm, preferably between 3.00 mm and 6.00 mm.

According to an advantageous embodiment of the present application, the inner surface and the outer surface are opposite surfaces along the thickness of the wall.

According to an advantageous embodiment of the present application, the silicone layer is delimited by the flanges of the hood.

According to an advantageous embodiment of the present application, the silicone layer is arranged between the wall and at least one or each sensor.

According to an advantageous embodiment of the present application, each fixing flange axially delimits the wall.

According to an advantageous embodiment of the present application, the axial flanges extend radially towards the outside of the wall, where applicable from the outer surface of the wall.

According to an advantageous embodiment of the present application, the wall has a thickness greater than 4.00 mm, preferably greater than 6.00 mm, more preferably greater than 8.00 mm, where applicable greater than 10.00 mm or 15.00 mm. The greater thickness of the wall increases its strength, which offers the advantage of being able to attach test equipment thereto or better resist vibrations. The fixing allows drillings to be made to create anchoring points.

According to an advantageous embodiment of the present application, the silicone layer and/or the wall has/have constant thickness.

The object of the present application is also a method for testing a turbine engine on a test bench, in particular a turbojet or turboprop engine, the method comprising the following steps: (b) mounting of a test engine hood on the turbine engine, the test hood comprising a wall with an inner surface surrounding the turbine engine; (c) fixing of the turbine engine to the test bench; (d) testing of the turbine engine on the test bench; distinguished in that the test hood comprises a silicone layer covering the inner surface of the wall and able to insulate the wall thermally.

According to an advantageous embodiment of the present application, during step (c), fixing of the turbine engine, the test hood is fixed to the test bench, where applicable the test bench comprises an adapter with fixing portions which cooperate with the test hood.

According to an advantageous embodiment of the present application, the test hood comprises a circular or arcuate flange at each upstream and downstream end of the wall, during step (b), mounting of the test hood, at least one or each circular or arcuate flange comes into contact, where applicable circular contact, with the turbine engine.

According to an advantageous embodiment of the present application, during step (b), mounting of the test hood, the silicone layer surrounds the turbine engine over the majority of the axial length of the wall, preferably over its entire length.

According to an advantageous embodiment of the present application, during step (b), mounting of the test hood, the contact, where applicable circular contact, of at least one or each flange is axial and/or radial.

According to an advantageous embodiment of the present application, the method comprises a step of removing and/or a step of refitting the flight hood on the turbine engine.

According to an advantageous embodiment of the present application, the test hood is heavier than the flight hood.

According to an advantageous embodiment of the present application, the wall of the test hood is thicker and/or heavier than the wall of the flight hood.

The object of the present application is also a use of silicone for thermal insulation of the inner surface of a wall of a test engine hood of the turbine engine during testing of the turbine engine on a test bench.

According to an advantageous embodiment of the present application, the silicone comprises polysiloxane to at least 30%, preferably at least 50%, where applicable at least 70% by mass.

According to an advantageous embodiment of the present application, the silicone forms a silicone layer comprising quartz, where applicable to less than 20% by mass.

According to an advantageous embodiment of the present application, the silicone forms a silicone layer comprising reticulants, where applicable between 2% and 20% by mass.

The present application provides a specific coating on the wall. It allows a combination of different materials, exploiting the specific advantages of each; these include mechanical strength, thermal resistance, and the thermal capacity of silicone. The space between the casing and the turbine engine may reach temperatures of over than 350° C. without the casing or casings being truly endangered. The silicone composition avoids phenomena of swelling and/or detachment of the wall.

The inner surface of the wall may be totally covered by the silicone layer and optionally by the circular and/or axial flanges. Accordingly, the casing, in particular the wall, is provided with a barrier, a tight film, providing integral mechanical, chemical and thermal protection.

In the description below, the terms "inner" or "internal", and "outer" or "external", refer to positioning relative to the rotation axis of an axial turbine engine.

FIG. 1 shows in a simplified fashion a test bench 2 for an axial turbine engine 4, such as turboprop engine or turbojet, in particular a double flow turbine.

The test bench 2 may be ground test bench 2 which is housed in a construction comprising a corridor 6 in which the turbine engine 4 is tested; only a section of the corridor is shown. During the test, the turbine engine 4 works with the air present in the corridor 6, drawing in air upstream and expelling it downstream. Devices may allow modification of the test conditions by injection of a mist, shifting the axis of the air upstream and accelerating it. The test bench 2 comprises a frame 8 or adapter 8 to which the turbine engine 4 is fixed by suspension in the manner of its fixing below the wing of an aircraft. As an option, an inlet sleeve 10 may be added to orient, guide and homogenise the flow entering the turbine engine.

In an alternative of the present application, the test bench may be in the open air and may comprise a vertical pillar fixed to the ground. The pillar is itself extended laterally by a horizontal cross-piece. The cross-piece may comprise a descending arm on which the turbine engine is fixed, the arm being arranged at the opposite horizontal end to the pillar.

The turbine engine comprises a fan 12, a first compression level 14 called the low-pressure compressor 14, a second compression level 16 called the high-pressure compressor 16, a combustion chamber 18 and one or more levels of turbines 20. In operation, the fan 12 creates an air flow which is divided into a primary flow 22 through the various above-mentioned levels of the turbine engine 4, and a secondary flow 24 passing through an annular conduit along the machine to then re-join the primary flow 22 exiting the turbine 20. The flows are guided by engine casings or engine hoods. These have circular, annular or generally tubular forms to delimit the inside and outside of the primary flow 22 and the secondary flow 24.

With the aim of performing a test, certain elements of the turbine engine are replaced by test equipment. In particular, flight engine hoods may be replaced by test engine hoods 26, adapted to tolerate the test conditions of the turbine engine 4. Such a test hood 26 may be used to surround the combustion chamber 18 and/or the high-pressure turbine 20. The hood 26 may serve to delimit the interior of the secondary flow 24.

The use of a test hood 26 offers further advantages. It allows use of a hood which is stronger mechanically and thermally, thanks amongst others to a greater thickness. In fact, one of the aims of the tests is to find the limits of the turbine engines 4, at the risk of provoking an incident such as a loss of a vane, generating vibrations of 100 g. Further incidents may occur, for example breakage of a hot-air sampling pipe which may damage certain equipment, or breakage of a fuel pipe which could then cause a fire. In the event of destruction, the loss of the test hood 26 is below the value of the flight hood, since the testing is less; where applicable, the materials and production processes are less costly. Advantageously, the test hood 26 is designed to be stronger than the flight hood in order to resist precisely the incidents which may be encountered during testing. The increase in thickness of the wall facilitates fixing of the sensors or any necessary equipment.

Figure 2:
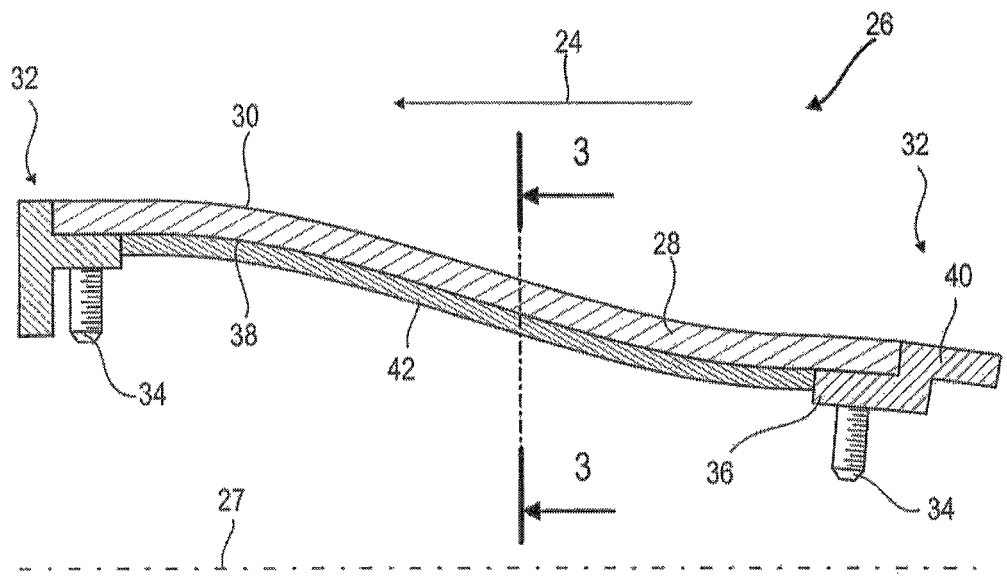
FIG. 2 is a section view of a half-shell of the test casing according to the present application.

FIG. 2 shows a profile section of the test engine hood 26 shown on FIG. 1. The test hood 26 may be made of two half-shells, only one of which is shown here. The rotation axis 27 of the turbine engine is illustrated by the dotted line.

The test hood 26 here has a circular form. It comprises a wall 28 which may be circular, generally tubular or as a pointed arch. The outer surface 30 of the test hood 26, and in particular its wall, is identical to that of the flight hood i.e. that which is normally mounted on the turbine engine when it is driving an aircraft in flight.

The test hood 26 comprises at least one circular or arcuate flange 32. Each flange 32 is advantageously metallic, made of titanium, steel or aluminium, the material being selected to reinforce and stiffen the wall 28 while offering heat resistance. This heat resistance is important since the flange 32 may be close to or in contact with the turbine engine at the level of the combustion chamber or a turbine. Advantageously, a flange 32 is arranged at each axial end of the wall 28, following this on an arcuate portion. The flanges 32 are fixed by pins 34 which protrude towards the inside of the flanges and of the wall 28.

At least one or each flange 32 has the form of a profiled section, the profile of which has a first portion 36 which follows the inner surface 38 of the wall 28, and a second portion 40 which extends the wall 32. Where applicable, the second portion 40 is flush with the outer surface 30 of the wall; their respective outer surfaces may be tangent or continuous. In this way the second portion 40 may contribute to guiding the secondary flow 24 of the turbine engine without creating turbulence.

The test wall 28 may be produced by moulding. It may be produced from a polymer material such as a composite material with organic matrix. The composite material may comprise a fibrous preform with a stack of carbon-fibre layers and/or glass-fibre layers. The moulding, like the composite aspect, facilitates the production of the hood 26 and in particular its wall 28. The material and the process selected simplify the production of complex curves without increasing the cost. These choices offer the advantage of producing very precise surfaces, as precise as the outer surface of the flight hood. The effect is to be able to produce a test hood 26 which is faithful to the flight hood, and to guide the flow in an identical fashion. Thus the test geometry does not disrupt the test conditions and is as faithful as possible to actual conditions.

The test hood 26 also comprises a silicone layer 42. The silicone layer covers the inner surface 38 of the wall 28, preferably the whole surface, where applicable the whole surface between the circular or arcuate flanges 32. The silicone layer has a thickness which may be constant. Its coefficient of heat conduction may be less than that of the wall material. The layer 42 may encircle the combustion chamber and the high-pressure turbine or any other heat source liable to damage the wall 28. The advantage here is to prevent the thermal degradation of the wall 28. The casing comprises a radially inner surface which is formed on the silicone layer 42. This layer 42 may also form a mechanical protection against projections, explosions from a compressor, turbine or the combustion chamber.

The silicone layer 42 may be applied by spraying in several sweeps. The silicone layer 42 may have a total thickness of between 0.1 mm and 20 mm, suitably equal to 5 mm. The silicone of the layer may comprise polysiloxane to at least 10%, preferably at least 30%, more preferably at least 60% by mass; where applicable, the polysiloxane is polydimethylsiloxane. The silicone layer may comprise less than 20% by mass quartz (SiO2) and/or between 20% and 2% reticulants, and/or less than 2% by mass methyltriacetoxysilane, and/or at least 2% by mass ethyltriacetoxysilane. Such a silicone is well known to the person skilled in the art; product CAF8 by the company Bluestar Silicones France S.A.S. may be used.

Figure 3:
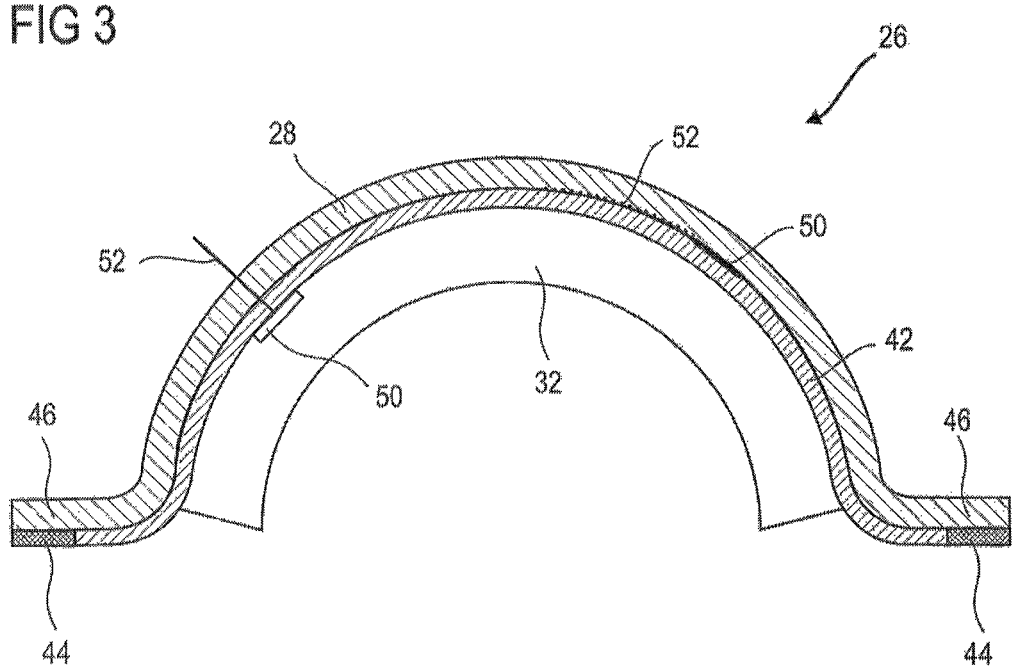
FIG. 3 is a section view, along line 3-3 marked on FIG. 2, of a half-shell of the test casing according to the present application.

FIG. 3 shows a section of the test casing along line 3-3 marked on FIG. 2. A downstream semi-circular flange 32 is shown in the background.

The test casing 26 may comprise two attached axial fixing flanges 44 which extend along the separating plane of the two half-shells. The attached flanges 44 allow the two half-shells to be joined by fixing via specific fixing portions. The attached flanges 44 may be metallic, as may the semi-circular flanges 32. The housing comprises axial flanges 46 radially extending the wall 28, which are potentially made of one material with the wall 28. The attached flanges 44 are plated, fixed to the axial flanges 46 of the housing 26, and fixed to each other. They may delimit the silicone layer 42 such that the wall 28 is totally covered from one attached fixing flange 44 to the other. In particular, the silicone layer 42 may cover a flange 46 made of one material with the wall.

The test casing 26 may comprise sensors 50 for monitoring the operating conditions of the turbine engine during the test. A thermometer such as a thermocouple and a pressure sensor may be integrated. At least one or each sensor 50 is in contact with the silicone layer 42 which forms an intermediate element between the sensor and the wall 28. Where applicable, at least one sensor 50 is covered by the silicone layer 42. Additional fire sensors may be provided. The test casing 26 therefore allows integration of the sensors 50 where a flight hood cannot receive them, the advantage being to obtain further test data, for example on the combustion chamber.

In addition, the test hood 26 has connections 52, electrical connections 52 for sensors 50. These connections 52 may comprise wires or plugs passing radially through the wall 28. They may also be wires with thermally and electrically insulating sheaths, which pass through the wall or run along it. The wires may be covered by the silicone layer 42. The wall 28 may comprise openings for the passage of wires; where provided, the openings are sealed by the silicone layer.

Figure 4:
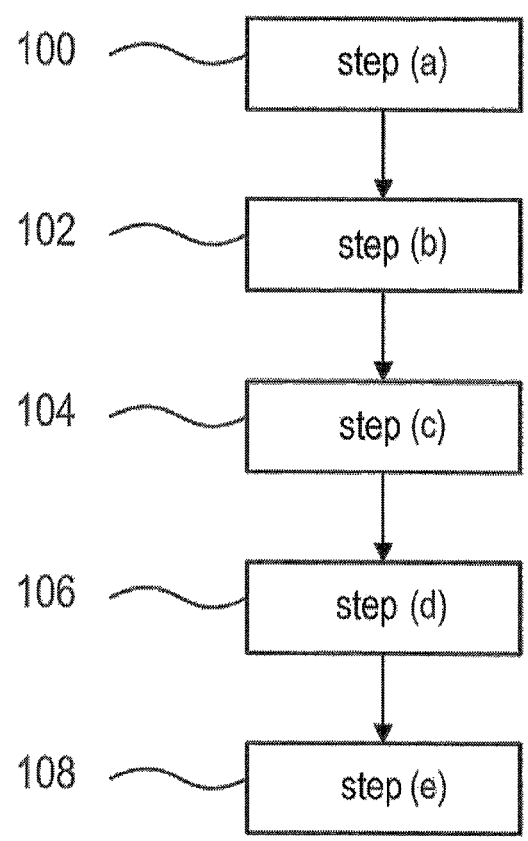
FIG. 4 illustrates a diagram of a method for testing a turbine engine according to the present application.

FIG. 4 shows a method for testing an axial turbine engine with a test engine hood which may be identical to that described in the preceding figures. Similarly, the turbine engine tested may correspond to that described in FIG. 1.

The method may also comprise the sequence of the following steps, where applicable performed in the following order:

(a) supply and/or production 100 of a turbine engine to be tested, such as a double flow or triple flow turboprop engine or turbojet;

(b) mounting 102 of a test engine hood on the turbine engine, the test hood comprising a wall with an inner surface surrounding the turbine engine;

(c) fixing 104 of the turbine engine to the test bench;

(d) testing 106 of the turbine engine on the test bench;

(e) dismantling 108 of the turbine engine.

The test hood advantageously comprises a silicone layer covering the inner surface of the wall so as to insulate the wall thermally.

During step (a), supply and/or production 100, the turbine engine may comprise a flight engine hood which is removed at the start of step (b), mounting 102 of the test engine hood.

The hood comprises a circular or arcuate flange at each upstream and downstream end of the wall, during step (b), mounting 102, at least one or each circular flange may come into contact, where applicable circular contact, with the turbine engine and/or may be fixed to the turbine engine. The contact and/or fixing may be against a turbine such as the high-pressure turbine. During step (b), mounting 102, the silicone layer may surround the turbine engine over the majority of the axial length of the wall, preferably over its entire length.

During step (c), fixing 104 of the turbine engine, the test hood may be fixed to the test bench. Where applicable, the test bench comprises an adapter with fixing portions which cooperate with the test hood.

During step (e), dismantling 106, the test hood is removed and the flight hood refitted. The test hood may be used for another test on another turbine engine, or on the same turbine engine for a future test. With regard to the present application, step (e) dismantling 106 is optional, as is step (a) supply and/or production 100. Several repetitions of steps (b) mounting 102, (c) fixing 104, (d) testing 106 may be performed before the supply of another turbine engine. Similarly, several steps (b), mounting 102, may be performed in succession or during the method, since several test casings may be mounted along the turbine engine. According to the present application, it is also possible to reverse the order of steps (b) mounting 102 and (c) fixing 104, since the test casing may also be mounted on the turbine engine after it has been fixed to the test bench.

We claim:

1. A turbine engine comprising:
a combustion chamber; and
a test engine hood including an annular duct for an annular flow, and being intended to replace a flight engine hood of the turbine engine during a test of the turbine engine on a test bench, the test engine hood extending axially of such a length that it surrounds the combustion chamber, the test engine hood comprising:
a wall made of composite material with an organic matrix, the wall having an outer surface delimiting the annular flow and an inner surface opposite the outer surface; and
a silicone layer covering the inner surface of the wall and able to insulate the wall thermally, the silicone layer having a thickness comprised between 3.0 and 6.0 mm.

2. The turbine engine in accordance with claim 1, wherein the silicone layer is electrically insulating.

3. The turbine engine in accordance with claim 1, wherein the composite material comprises carbon fibres and glass fibres.

4. The turbine engine in accordance with claim 1, wherein the silicone layer covers the majority of the inner surface of the wall.

5. The turbine engine in accordance with claim 1, wherein the wall is arcuate and is formed by two half-shells defining a casing comprising attached axial fixing flanges joining said half-shells.

6. The turbine engine in accordance with claim 1, further comprising electrical connections passing through the wall and through the silicone layer.

7. The turbine engine in accordance with claim 6, further comprising sensors protruding inwardly from the silicone layer and connected to the electrical connections passing radially through the silicone layer.

8. The turbine engine in accordance with claim 1, further comprising sensors which are in contact with the silicone layer.

9. The turbine engine in accordance with claim 1, further comprising an arcuate flange at an axial end of the wall, said arcuate flange contacting the silicone layer.

10. The turbine engine in accordance with claim 1, further comprising an arcuate flange which is made of metal and which is fixed to the wall via fixing pins extending radially internally.

11. The turbine engine in accordance with claim 1, further comprising an arcuate flange which comprises a first arcuate portion which extends along the inner surface of the wall, and a second arcuate portion which extends along the wall flush with the outer surface of the wall, so as to guide the annular flow.

12. A turbine engine comprising:
a combustion chamber; and
a test engine hood, the test engine hood forming an annular duct for an annular flow, said test engine hood being intended to replace a flight engine hood of the turbine engine during a test of the turbine engine on a test bench, the test engine hood extending axially of such a length that it surrounds the combustion chamber of the turbine engine, the test engine hood comprising:
a wall made of composite material with an organic matrix, the wall having an outer surface delimiting the annular flow and an inner surface opposite the outer surface;
a silicone layer covering the inner surface of the wall and able to insulate the wall thermally, the silicone layer comprising at least 30% by mass of polysiloxane in contact with the inner surface;
electrical connections passing through the wall and through the silicone layer; and
sensors protruding inwardly from the silicone layer and connected to the electrical connections passing radially through the silicone layer.

13. The turbine engine in accordance with claim 12, wherein the silicone layer comprises less than 20% by mass of quartz particles, the quartz particles being in contact with the inner surface of the wall.

14. The turbine engine in accordance with claim 12, wherein the silicone layer comprises cross-linking agents.

15. The turbine engine in accordance with claim 12, wherein at least one of the sensors is a temperature sensor or a fire detector.

* * * * *